(12) United States Patent
Vaidyanathan et al.

(10) Patent No.: US 7,630,904 B2
(45) Date of Patent: Dec. 8, 2009

(54) INTEGRATED ELECTRONIC MARKETPLACE AND ONLINE DISPUTE RESOLUTION SYSTEM

(75) Inventors: Lalitha Vaidyanathan, San Francisco, CA (US); John Quinn, San Francisco, CA (US); Ahmed Khaishgi, San Francisco, CA (US); Cara Cherry, San Francisco, CA (US)

(73) Assignee: Square Trade, Inc., San Francisco, CA (US)

( * ) Notice: Subject to any disclaimer, the term of this patent is extended or adjusted under 35 U.S.C. 154(b) by 993 days.

(21) Appl. No.: 10/672,136

(22) Filed: Sep. 26, 2003

(65) Prior Publication Data

US 2004/0059596 A1 Mar. 25, 2004

Related U.S. Application Data

(63) Continuation of application No. 09/504,159, filed on Feb. 15, 2000.

(51) Int. Cl.
*G06Q 10/00* (2006.01)
*G06Q 30/00* (2006.01)
(52) U.S. Cl. ......................................................... 705/1
(58) Field of Classification Search ..................... 705/1, 705/80
See application file for complete search history.

(56) References Cited

U.S. PATENT DOCUMENTS

| | | | |
|---|---|---|---|
| 5,495,412 A | 2/1996 | Thiessen | |
| 5,668,953 A | 9/1997 | Sloo | |
| 5,893,905 A | 4/1999 | Main et al. | |
| 5,895,450 A * | 4/1999 | Sloo | 705/1 |
| 5,956,687 A | 9/1999 | Wamsley et al. | |
| 5,970,475 A | 10/1999 | Barnes et al. | |
| 6,237,096 B1 | 5/2001 | Bisbee et al. | |
| 6,330,551 B1 | 12/2001 | Burchetta et al. | |
| 6,347,332 B1 | 2/2002 | Malet et al. | |
| 6,363,384 B1 | 3/2002 | Cookmeyer, II et al. | |
| 6,389,151 B1 | 5/2002 | Carr et al. | |
| 6,442,687 B1 | 8/2002 | Savage | |
| 6,470,448 B1 | 10/2002 | Kuroda et al. | |
| 6,766,307 B1 * | 7/2004 | Israel et al. | 705/80 |
| 2001/0007106 A1 | 7/2001 | Slaikeu | |
| 2002/0007362 A1 * | 1/2002 | Collins et al. | 707/5 |

(Continued)

FOREIGN PATENT DOCUMENTS

EP 0 689 824 A1 1/1996

(Continued)

OTHER PUBLICATIONS

Elangovan, A R, Managerial third party dispute intervetion: A prescriptive model of strategy selection, Academy of Management Review v20n4 pp. 800-830 1995.*

(Continued)

*Primary Examiner*—Janice A. Mooneyham
*Assistant Examiner*—Fonya Long
(74) *Attorney, Agent, or Firm*—Shumaker & Sieffert, P.A.

(57) ABSTRACT

System and methods resolving an electronic commerce dispute involving one or more parties by selecting one of two modes of resolving the dispute, the first mode being completely driven by an electronic agent and the second mode involving a human dispute resolution specialist; and presenting the resolution of the dispute to the one or more parties.

5 Claims, 12 Drawing Sheets

U.S. PATENT DOCUMENTS

2005/0044009 A1 2/2005 Stone et al.

FOREIGN PATENT DOCUMENTS

JP 2003114927 * 10/2001

OTHER PUBLICATIONS

Non-Profit Dating Service retrieved from the Internet Archive Wayback Machine of data Feb. 19, 1999.*
www.truste.com retrieved from the Internet Archive Wayback Machine.*
Gary Winston, "Virtual Settlement" online, Jan. 2000, Canadian Underwriter, p. 52.*
www.truste.com retrieved from the Internet Archive Wayback Machine, Dec. 12, 1998.*
Nyhart, "Computer Modeling in Dispute Resolution: An Overview," *Dispute Resolution Forum,* Apr. 1988, p. 3, 11-15.
Bordone, Robert C., "175 Electronic Online Dispute Resolution: A Systems Approach-Potential, Problems, and a Proposal," Harvard Negotiation Law Review, pp. 175-211, 1998, http://cyber.law.harvard.edu/property00/jurisdiction/bordoneedit.html.
Chua, Lusan, "Ebay: Conflict Management in an Online Community," 2002, http://www.ombuds.org/cyberweek2003/chua.paper.htm.
Devack, Melissa, "Intellectual Property As An Investment: A Look At How ADR Relates to the European Union's Proposal for Electronic Commerce in the Single Market," 2002, http://www.cardozo.yu.edu/cojcr/final_site/articles_notes/vol2_an/Devack.htm.
Geist, Michael, "Fair.com?: An Examination of the Allegations of Systemic Unfairness in the ICANN UDRP," University of Ottawa, Aug. 2001, http://aix1.uottawa.ca/~geist/geistudrp.pdf.
Gilbert, Pamela, "On Space, Sex and Stalkers," http://www.echonyc.com/~women/Issue17/art-gilbert.html.
Johnson, David R., "Dispute Resolution in Cyberspace," http://www.eff.org/Legal/Arbitration/online_dispute_resolution_johnson.article, Feb. 1994.
Katsh, Ethan M., "Dispute Resolution in Cyberspace," Conn. L. Rev., 1996, http://www.umass.edu/legal/articles/uconn.html.
Katsh, Ethan et al., E-Commerce, E-Disputes, and E-Disputes Resolution: In the Shadow of "eBay Law", Ohio State Journal on Dispute Resolution, vol. 15:3, pp. 705-734, 2000.
Manevy, Isabelle, "Online Dispute Resolution: what future?" June 2001, http://www.ombuds.org/cyberweek2002/manevy_odr01.pdf.
Mudd Jr., Charles Lee, "Cybercourt: A Virtual Resolution of Differences," 1995, http://www.mudd.org/professional/articlesclm/cybercourt.htm.
Rabinovich-Einy, Orna, "The Ford-Firestones of the Future: Resolving Offline Disputes in an Online Society," http://www.ombuds.org/cyberweek2003/rabinovich_einy.htm.
Schneider, Michael E. et al., "Dispute Resolution in International Electronic Commerce," http://www.disputes.net/cyberweek2001/interElecCommerce.htm.
SchWeber, Claudine, "The Use of Technology in Conflict Resolution," 1995, http://www.batnet.com/oikoumene/arbtadr.html.
Thiessen, Ernest et al., "Beyond Win-Win in Cyberspace," Ohio State J. of Dispute Resolution, 2000, 15(3), 643, http://www.smartsettle.com/more/beyond/BeyondWinWin.html.
"ADR Resources," Center for Information Technology and Dispute Resolution, http://www.ombuds.org/center/articles1.
"Code of Online Business Practices," Council of Better Business Bureau, Inc., 2003, http://www.bbbonline.org/reliability/code/code.asp.
"Disputes in cyberspace 2001," Update for Online Disputes Resolution for Consumers in Cross-Border Disputes, Office for Developed and Transition Economies, Consumers International, Nov. 2001.
"Out-of-Court Dispute Settlement Systems for E-Commerce," The Report form the workshop held in Brussels, European Commission Report.
"Proceedings of a Conference on Electronic Dispute Resolution," National Center for Automated Information Research (NCAIR), May 22, 1996, Washington D.C.
Declaration of Ethan Katsh Under 37 C.F.R. 1.132.
Explanation of 'contract' and 'marketplace' printed from http://www.dictionary.com.
Information on Bell Atlantic, 1998, 1999.
Information on Neural Tech, Inc., 1996-1998.
Unisys to market Neural Tech CADRE software as part of its credit card dispute processing solution set, Oct. 22, 1998.
U.S. Appl. No. 09/634,149, filed Aug. 8, 2000, entitled "Electronic Seals," by Khaishgi, Ahmed et al.
U.S. Appl. No. 10/643,263, filed Aug. 19, 2003, entitled "Certification and Unique Electronic Seals for Online Entities," by Khaishgi, Ahmed et al.
U.S. Appl. No. 10/643,309, filed Aug. 19, 2003, entitled "Security for Uniquely Generated Electronic Seals of Certification," by Khaishgi, Ahmed et al.
Dr. Leslie Smith, "An Introduction to Neural Networks," University of Stirling, http://www.psych.utoronto.ca/~reingold/courses/ai/cache/InvSlides.html, 9 pages, Jul. 24, 1997.

* cited by examiner

INTEGRATED ELECTRONIC MARKETPLACE AND ONLINE DISPUTE RESOLUTION SYSTEM

This application is a continuation of and claims priority to Ser. No. 09/504,159, filed Feb. 15, 2000, the entire content of which is incorporated herein by reference.

TECHNICAL FIELD

The invention relates to an electronic dispute resolution system.

BACKGROUND

The emergence of the Internet as a common communication medium has crystallized into reality the possibility of electronic (on-line) exchange of goods among buyers and sellers in various global electronic marketplaces. Traditionally, the trading or exchanging of goods is conducted through trading forums, such as classified advertisements, collectible shows, garage sales and flea markets, or through intermediaries, such as auction houses and local dealer shops. The traditional markets are inefficient for a number of reasons. First, their fragmented and regional nature presents economic obstacles for buyers and sellers in meeting, exchanging information and completing the transactions. Second, traditional markets offer a limited selection of goods. Third, they often have high transaction costs from intermediaries. Fourth, buyers and sellers in these markets lack a reliable and convenient way of setting prices for sales or purchases.

The ubiquity and low cost associated with the Internet have turned it into a convenient medium by which consumers can purchase a variety of goods and services. Typically, a customer selects various products or services from a seller over the Internet. Once the customer has finished shopping, he or she enters billing information such as name, address, and credit card number. After verification of credit, the seller ships the product or provides the service to the customer. Since buyers and sellers meet on-line, convenience is achieved cost-effectively using the unique attributes of the Internet to facilitate trading.

The anonymity of the Internet provides a relatively safe medium for unscrupulous organizations. Thus, while convenient, the Internet does not provide a clear and convenient mechanism to resolve after-purchase disputes. These disputes may range from minor complaints about the quality of the product or service, or may involve fraud and other illegal or unethical activities in connection with electronic commerce.

When consumers receive unsatisfactory goods or services, or are involved in a dispute with a vendor or entity, they typically must lodge complaints directly to the vendor by calling the vendor or filling out a complaint form and sending the form to the vendor. Correspondingly, when a customer rejects a valid bill or when the vendor does not receive timely payments, the vendor typically lodges a complaint against the customer in court or uses a repossession/debt collection service. However, the traditional court system is expensive to use and the system may deny justice to those who cannot afford the expense or those with claims too small to justify the expense. This process resolves disputes between two parties and does not inform other consumers about the complaints. Moreover, the current legal system is based on geographic jurisdiction and thus is not effective in dealing with cross-border transactions such as occur on the Internet.

A less confrontational option available to consumers is to file complaints with government and non-profit consumer organizations such as the Better Business Bureau (BBB). These organizations provide services that inform consumers about complaints lodged against an entity such as a company by compiling complaints filed against different companies and then allowing consumers to check the reputation of a particular subject by requesting a report listing the complaints lodged against the subject.

A solution disclosed in U.S. Pat. No. 5,895,450 provides a method and apparatus for handling complaints that allows complainants to lodge anonymous complaints against subjects, informs the subjects of the complaints, permits the subjects to respond to the complaints, encourages settlements of the complaints and holds the parties to the complaints accountable for their conduct while attempting to resolve the complaints. A central computer is programmed to receive complaints and responses, store the complaints and responses in individual data records, and negotiate settlements to the complaints. Once the disputes are resolved, the settlements or judgments are stored along with their respective complaints and responses in the data records. The central computer is also programmed to provide public access to the data records to permit viewing of the corresponding complaints, responses, and settlements for allowing other users to gauge the conduct of the subjects and to encourage the subjects to respond to the complaints in a timely and satisfactory manner. Moreover, the central computer is programmed to monitor and rate the conduct and performance of both the complainants and the subjects during the course of the disputes. The ratings can be used to affect the outcome of the disputes and for other purposes to hold the parties accountable for their conduct during the attempted resolution of the disputes to encourage good conduct and cooperation between the parties during the course of the disputes.

Other dispute resolution systems include Web sites that offer arbitration or mediation. The sites that provide online dispute resolution include sites from the National Arbitration Forum (http://www.arb-forum.com); Arbelest (http://arbelest.com); i-courthouse (http://www.i-courthouse.com). The National Arbitration Forum web site offers a set of resources traditionally available for arbitration on the Internet. Arbelest's web site provides a set of dispute resolution resources, including objective, real-time dispute resolution services, automated claim settlement, and a comprehensive online reference library. ICourthouse's site offers Panel Jury trials that allow the parties to present their case before a jury selected according to demographic information and the jurors' answers to questions. Other dispute resolution sites include CPA WebTrust and internetneutral (http://internetneutral.com); World Intellectual Property Organization (http://arbiter.wipo.int/arbitration); Clicknsettle (http://clicknsettle.com); Cybersettle (http://cybersettle.com); Cybertribunal (http://www.cybertribunal.org); Rent-a-court (http://rent-a-court.com); MIRC (onlinemediators.com); Safeonline (http://www.safeonline.com); Bid$afe (http://www.auctions.com/au/sharedcontent/bidsafe_info.asp); i-escrow (http://www.iescrow.com); tradeSafe (http://www.tradesafe.com); http://resolutionforum.org; http://ilevel.com; http://disputes.org; and http://ombuds.org

SUMMARY

In one aspect, the invention resolves an electronic commerce dispute involving one or more parties by selecting one of two modes of resolving the dispute, the first mode being completely driven by an electronic agent and the second mode involving a dispute resolution specialist; and presenting the resolution of the dispute to the one or more parties.

Implementations of the above aspect may include one or more of the following features. The selection of the mode includes applying a case-based reasoning system to assist the determination of the modes. The case-based reasoning system can contain a history file. The history file can contain patterns and precedents, which are applied to generate an outcome prediction to assist the determination of the mode. The outcome prediction can be presented to the parties and can include one or more likely outcomes and associated probabilities of occurrence. Settlement positions can be received from the parties. The dispute can be automatically settled if the settlement positions satisfy a predetermined criterion. The predetermined criterion relates to a monetary or a non-monetary settlement position. The dispute resolution specialist can resolve the dispute by transitioning from a mediation stage to an arbitration stage. The dispute resolution specialist also generates a final recommended resolution that, once accepted by the one or more parties, is recited in a binding contract between the one or more parties stating the willingness to abide by the recommended resolution. The parties can communicate using a plurality of communication modes, including a private mode and a public mode. The communication mode can be selected by the dispute resolution specialist. The communications between the specialist and the parties can be kept private or public. Visual cues can be provided to highlight agreements between the parties. A meta-rating forum on the performance of a particular party can be maintained, and the data stored on the forum regarding performances of sellers and buyers can be accessed. The data can relate to participation in the dispute resolution process, or can relate to compliance of a participant to the final decision made in the resolution of the dispute. An offender in the dispute resolution system can be highlighted. A market-based system can be used for assigning a specialist to a particular dispute. The dispute resolution system can be provided as an insurance covering transactions, where a seller in a transaction is a registered subscriber before a transaction is insured. A visual indicia can be used to indicate membership in the dispute resolution process. The visual indicia can be a medallion. The system can emulate a court for on-line transaction parties.

In a second aspect, a system for resolving online disputes includes a network; an electronic marketplace coupled to the network; one or more sellers selling one or more items at the marketplace; one or more buyers consuming one or more items at the marketplace; and a dispute resolution system coupled to the network to resolve a dispute between one or more buyer and seller parties, the dispute resolution system adapted to select one of two modes of resolving the dispute, the first mode being completely driven by an electronic agent and the second mode involving a dispute resolution specialist.

Implementations of the above aspect may include one or more of the following features. The network can include a wide area network such as the Internet. The items can include products and services. The dispute resolution system can be implemented as a server.

In another aspect, a computer-assisted multi-mode dispute resolution process includes performing a cursory analysis and pre-programmed recommended resolution in a first mode; best match of the needs of the two parties to resolve the dispute in a second mode; providing a medium for the parties to independently resolve the dispute in a third mode; and providing a dispute resolution specialist to resolve the dispute in a fourth mode. Further, the specialist utilizes a combination of mediation, arbitration, and public/private message exchange with the parties. These combinations result in a definitive recommended resolution.

Advantages of the system and methods include one or more of the following. The system is, in effect, an electronic "court" for websites. The websites are technologically integrated into the system to make available the service to their users. The presence of the service on the websites increases the trust and confidence in of consumers in online transactions and thus reduces the incidence of disputes. A medallion can be provided to registered sellers to serve as a visible symbol of trust and increases buyers' confidence in transacting with seller.

The system is efficient and fast since it initially encourages the complainant and the subject of the complaint to directly resolve the complaint with each another. The system allows the subject of the complaint a chance to respond to the complaint and therefore protects its reputation when baseless complaints are filed. Moreover, the system applies a consistent and fair handling of consumer complaints so that on-line forum shopping can be avoided.

The system also provides a multi-mode resolution process that resolves disputes on multiple levels: first, a wizard determines if the dispute is simple in nature and can be resolved without going through the dispute resolution system—if a dispute is found to be simple, the wizard offers a plurality of suggestions for ways of resolving the dispute. For example, simple resolution may include disputing charge with a credit card provider, or contacting a shipping company to track delivery status.

If the dispute is not simple in nature, then other modes of resolution are attempted. The system can apply automatic settlement, where the system tries to match the needs of the two parties; third, failing above, parties are encouraged to independently resolve disputes; and fourth, failing above, a dispute resolution specialist is assigned to the case. Additionally, once the specialist is assigned, disputes are resolved in a style transitioning from mediation to arbitration and that results in a recommended settlement.

The system's multiple communication methods are also advantageous. The specialist uses the communication mode most appropriate to the situation. Exchanges between the specialist and the parties are kept private to allow the specialist to draw out the positions of the parties without causing direct conflict between each other. However, the exchange could also be public (like in a court trial) where the parties are allowed to respond to the other's submissions. Multiple parties can be allowed to participate in the discovery and evidence submission process.

The system also facilitates dispute resolution through a number of tools. The techniques support various information gathering and evaluation stages to prompt a timely settlement between the parties. The dispute resolution staff is aided with a timely and efficient gathering of information from which to formulate a settlement proposal. Moreover, these techniques facilitate a prompt assessment of the status of a claim. The techniques also automatically assemble data from records provided by both parties and calculate relevant settlement proposals to be sent to the parties.

The system also applies automatic tools such as an intelligent predictive reasoning system (also called case-based reasoning (CBR) system). CBR assists parties in disputes by indicating the likelihood of a particular outcome. This helps parties request reasonable solutions thereby increasing the likelihood of an easy settlement. It also assists the dispute resolution specialist in identifying similar past cases and indicating likely outcomes and their associated certainty. The system matches new disputes to "cases" from a historical database and then adapting successful outcomes from the past to the current situation. This technique increases the efficiency of the dispute resolution process and provides a high degree of decision uniformity. This effectively creates a semi-automated precedent-based resolution system.

Another tool automatically disaggregates elements of the dispute and visually highlights areas of agreement and disagreement. Such visual cues highlight agreement and facilitate a settlement of the dispute.

Further, the system provides a meta-rating forum where data is stored on the "performance" of sellers and buyers (for example, participation in the dispute resolution process, compliance with settlement, among others). The form is applicable across sites and enables sellers and buyers to build reputation across sites where they would like to transact. This mechanism also allows offenders of the system to be highlighted.

Additionally, the system provides a market-based system for assigning specialists. In more complex disputes such as business-to-business disputes, the specialists can choose their cases. This allows for the best match of specialization and interest and leads to the most effective resolution for the case.

The system allows consumers visiting a particular Web site to have greater assurance that the Web site provides a reasonable means to resolve differences between the consumers and the Web site after the products/services have been purchased. For sellers, the increased consumer confidence leads to higher volume of sales and improves customer relationship. By providing reputable sellers with a symbol indicating that disputes will be handled in a professional manner, the system enables the seller to tap into new markets, regardless of the longevity or brand-recognition of the seller in individual marketplaces. Buyers benefit by eliminating frustrating and costly delays associated with purchasing from new or unknown sellers, allowing buyers to price shop among sellers via electronic commerce for an optimal price and selection of goods without needing a prior business relationship. The system also reduces the buyer's administrative expenses and time in submitting complaints. The web-based dispute resolution system enables disputes to be resolved efficiently and quickly.

The details of one or more embodiments of the invention are set forth in the accompanying drawings and the description below. Other features, objects, and advantages of the invention will be apparent from the description and drawings, and from the claims.

DETAILED DESCRIPTION

Figure 1:
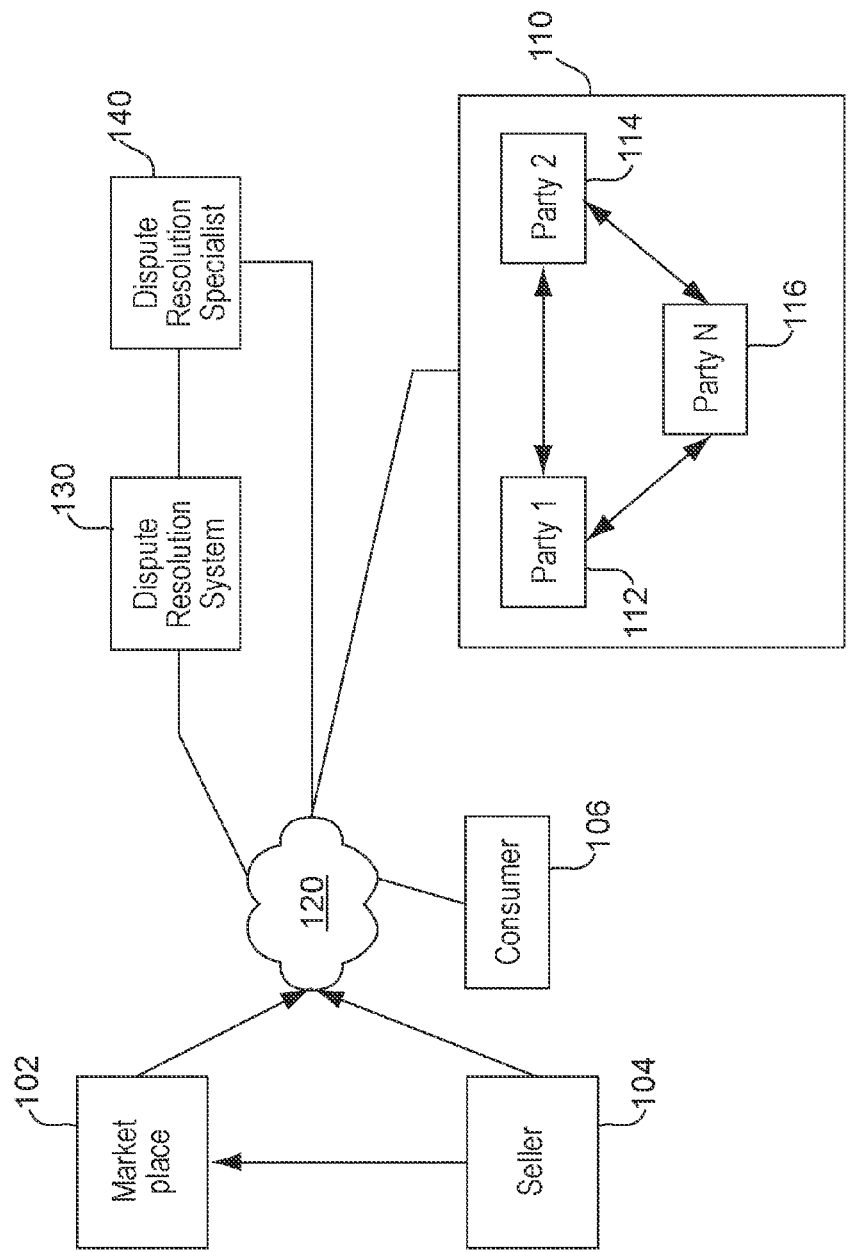
FIG. 1 is an exemplary environment that supports electronic dispute resolution in accordance with the invention.

FIG. 1 shows an environment 100 that supports electronic dispute resolution. In this environment, one or more sellers 104 offer their products and/or services to one or more consumers 106 at a marketplace 102. The marketplace 106 can be a physical mall or market or can be a website such as an online centralized trading place. The centralized trading place overcomes the inefficiencies associated with traditional person-to-person trading by facilitating buyers and sellers meeting, listing items for sale, exchanging information, interacting with each other and, ultimately, consummating transactions. Through such a trading place, buyers can access a significantly broader selection of goods to purchase and sellers have the opportunity to sell their goods efficiently to a broader base of buyers.

One exemplary person-to-person trading place on the Internet is eBay, located at www.eBay.com. eBay is a Web-based community in which buyers and sellers are brought together in an efficient auction format to buy and sell items such as antiques, coins, collectibles, computers, memorabilia, stamps and toys. The eBay service permits sellers to list items for sale, buyers to bid on items of interest and all users to browse through listed items in a fully-automated, topically-arranged online service that is available 24 hours a day, seven days a week.

The seller 104 may be a manufacturer. The marketplace 102 and the seller 104 can communicate directly with each other, or can communicate over a network 120. The network 120 can be a wide area network such as the Internet. The one or more consumers 106 can communicate with the marketplace 102 and indirectly the seller 104 over the network 120. A multiparty community 110 having a first party 112, a second party 114 and an nth party 116 can communicate with the network 120. Further, the first party 112, second party 114 and nth party 116 can communicate directly with each other.

Also connected to the network 120 is a dispute resolution system 130, which is detailed below. The dispute resolution system 130 can communicate directly with a network having one or more dispute resolution specialists 140. Alternatively, the dispute resolution specialists 140 can access the dispute resolution system 130 using the network 120.

The dispute resolution specialist can be a person who is trained in the art of conducting dispute resolution, including but not limited to mediation and arbitration. The dispute resolution specialist can also be a person who has had substantial experience mediating or arbitrating a range of disputes. Further, the dispute resolution specialist can be a person who has successfully completed a comprehensive mediation training program, or can be a person who has knowledge of the legal parameters of dispute resolution practices.

Each dispute resolution specialist 140 completes a rigorous training process. In one embodiment, the training is multi-phased. In phase 1, the specialist receives an introduction to online marketplaces. The specialist experiences first-hand sample transactions at sample auction sites, barter sites and direct-to-business arenas. In phase 2, the specialist receives an introduction to the online dispute resolution process. In phase 3, simulated dispute resolution cases are presented to the specialist as test cases. The skills developed in training cut across dispute arena. Criteria for successful completion of training include: ability to handle online material and to maneuver among online sites; ability to write intelligent articulate emails; understanding of internet marketplaces; demonstrated facility with the dispute resolution system through three simulations, and demonstrated dispute resolution skills through one simulation. After completing the basic training process, the specialists function as professionals who bear the responsibility for ensuring that they have the requisite content expertise about the dispute arena for the dispute at hand.

Figure 2A:
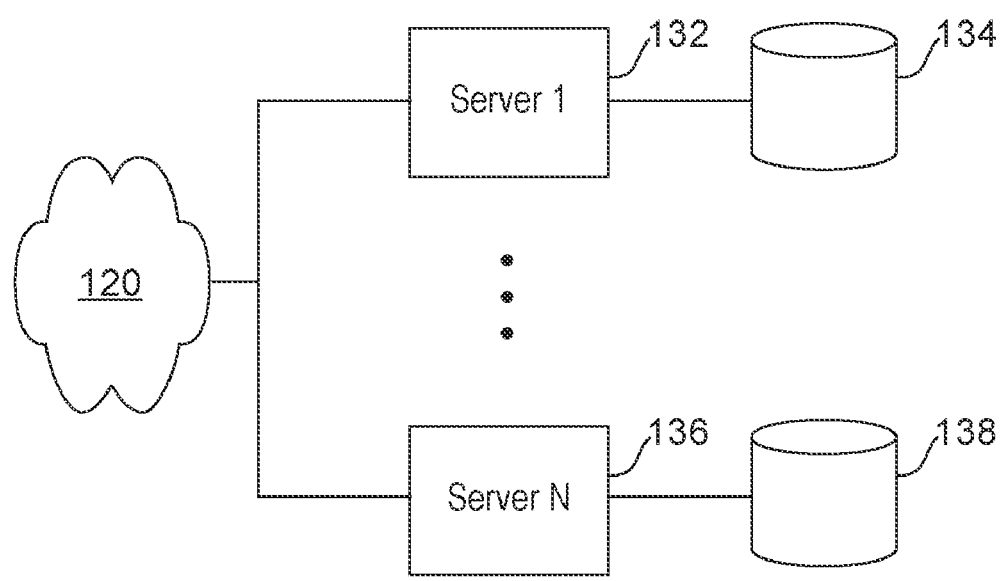
FIG. 2A is a diagram illustrating details of a first implementation of a dispute resolution system.

Referring now to FIG. 2A, one implementation of the dispute resolution system 130 is shown. In this implementation, the dispute resolution system 130 includes a plurality of redundant, fail-over servers 132-136. The servers 132-136 are connected to the network 120. Moreover, each server 132 or 136 is connected to a data storage system 134 and 138, respectively. To support fail-over, each server 132 or 136 can provide resources independent of the other until one of the servers fails. Each server continuously monitors the other server. When one of the servers fails, the surviving server acquires the shared drives and volumes of the failed server and mounts the volumes contained on the shared drives. Applications that use the shared drives can also be started on the surviving server after the failover. Further, a manual-failover operation can be performed on the shared volumes at any time in order to perform tasks such as scheduled maintenance on one of the servers. As soon as the failed server is booted up and the communication between servers indicates that the server is ready to own its shared drives, the servers automatically start the recovery process.

Figure 2B:
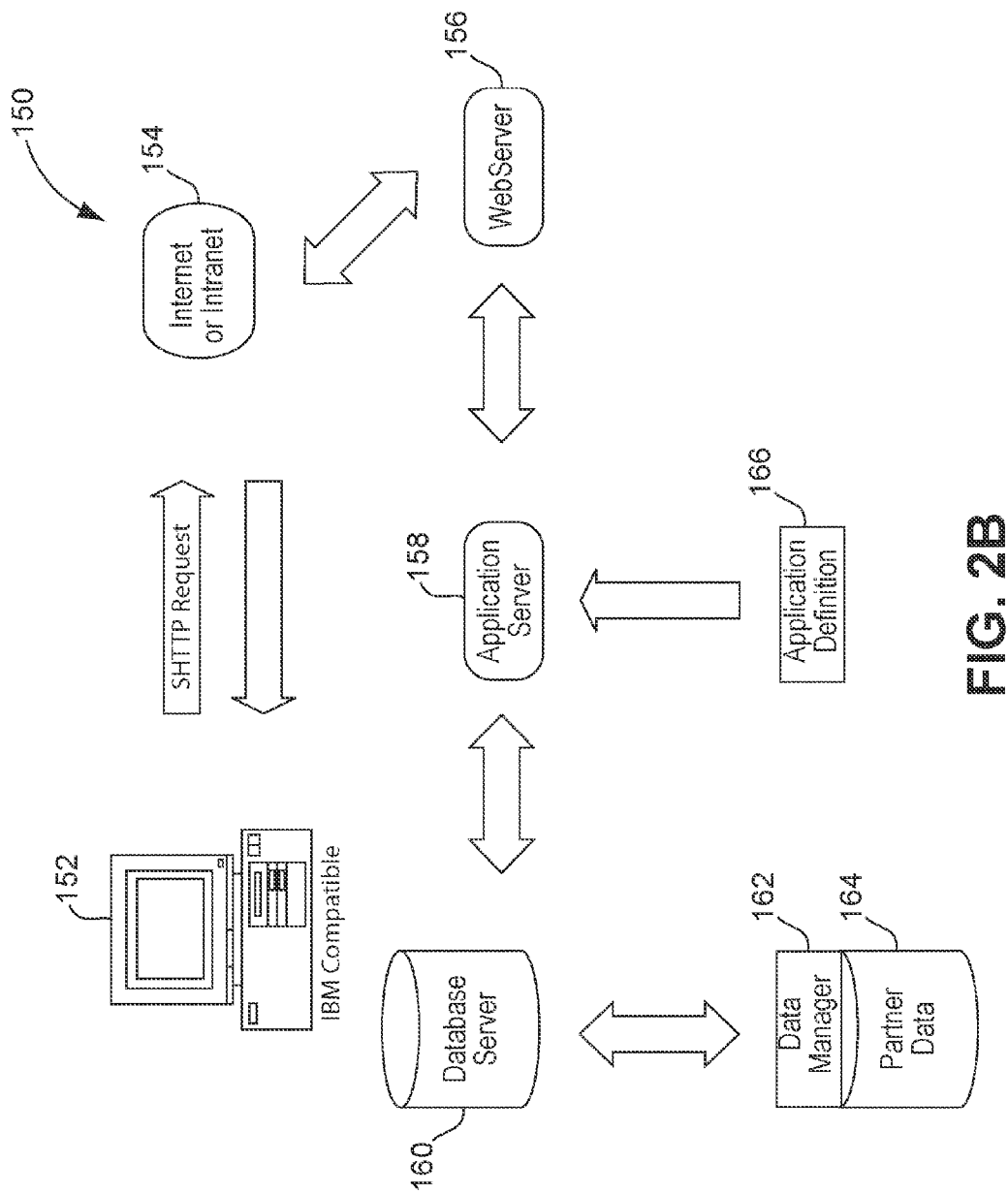
FIG. 2B is a diagram illustrating details of a second implementation of a dispute resolution system.

Referring now to FIG. 2B, a second implementation 150 of the dispute resolution system is shown. In this implementation, a customer (which can be either the seller or the buyer) or a dispute resolution specialist can access data using a web browser on a workstation 152. The data is securely transferred between the workstation 152 to a network 154. The network 154 can be the Internet or can be an intranet. A server 156 communicates with the network 154. The server 156 also communicates with a second server 158, which can be an e-commerce server such as the ColdFusion server, available from Allaire Inc. The server 158 is used as a Web Application Server to present HTML applications. These applications allow customers to file and manage disputes and dispute resolution specialists to manage cases over the Internet.

The server 158 receives data from a set of remote objects that reside in the partner's system 166. The remote objects, which can be enterprise Java Beans, are provided to allow business partners of the system to integrate with the dispute resolution system. Both DCOM objects and Enterprise Java Beans models can be used. These objects provide functionality to receive and send specific information to the dispute resolution system 130. The objects will transparently deal with communication issues including server unavailability and performance. Example functionality includes informing the dispute resolution system 130 of relevant partner transactions and allowing partners to query the dispute resolution system data such as the status of a specific marketplace seller 104.

The server 158 in turn communicates with a structured query language (SQL) server 160. The SQL server 160 also communicates with a data manager 162. The data manager 162 in turn communicates with one or more partner databases 164. Partners integrate with the system, by exposing relevant functionality on their respective websites, for example, allowing customers to dispute a transaction. This integration is achieved by a predefined set of URLs that a partner embeds in the partner's HTML application.

Figure 3:
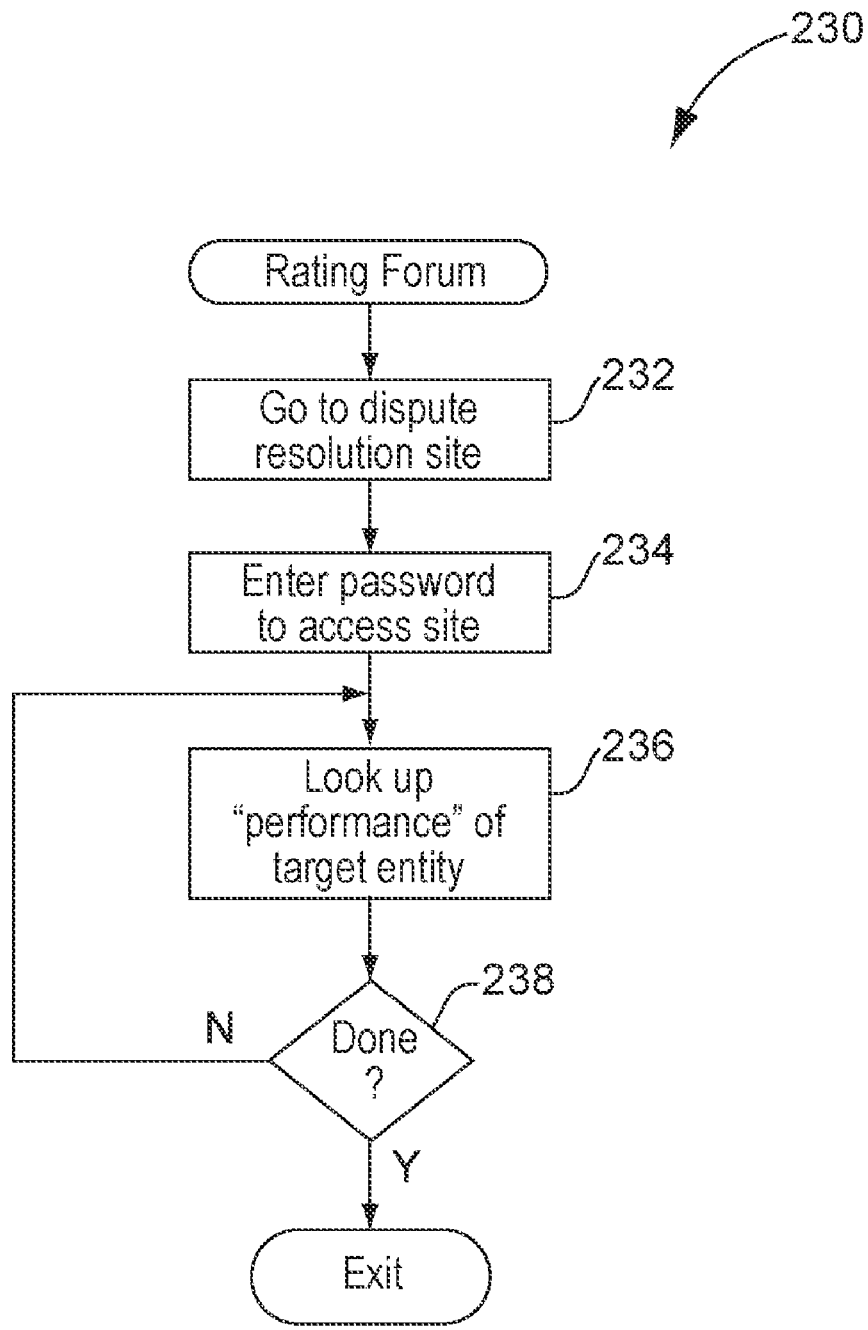
FIG. 3 is a flow chart illustrating a process to check the dispute resolution performance history of a party.

Referring now to FIG. 3, a process 230 that provides a forum for rating buyers and sellers is shown. First, either a party such as a buyer or a seller can access the dispute resolution system (step 232). Next, the party can enter a password to access the system (step 234). If the password is correct, the process 230 allows the party to access information relating to the "performance" of another party (step 236). The process 230 then checks whether the party is finished with the checking process (step 238). If not, the process 230 loops back to step 236 to allow the party to continue looking up the performance of other parties. Alternatively, the process 230 exits.

Figure 4:
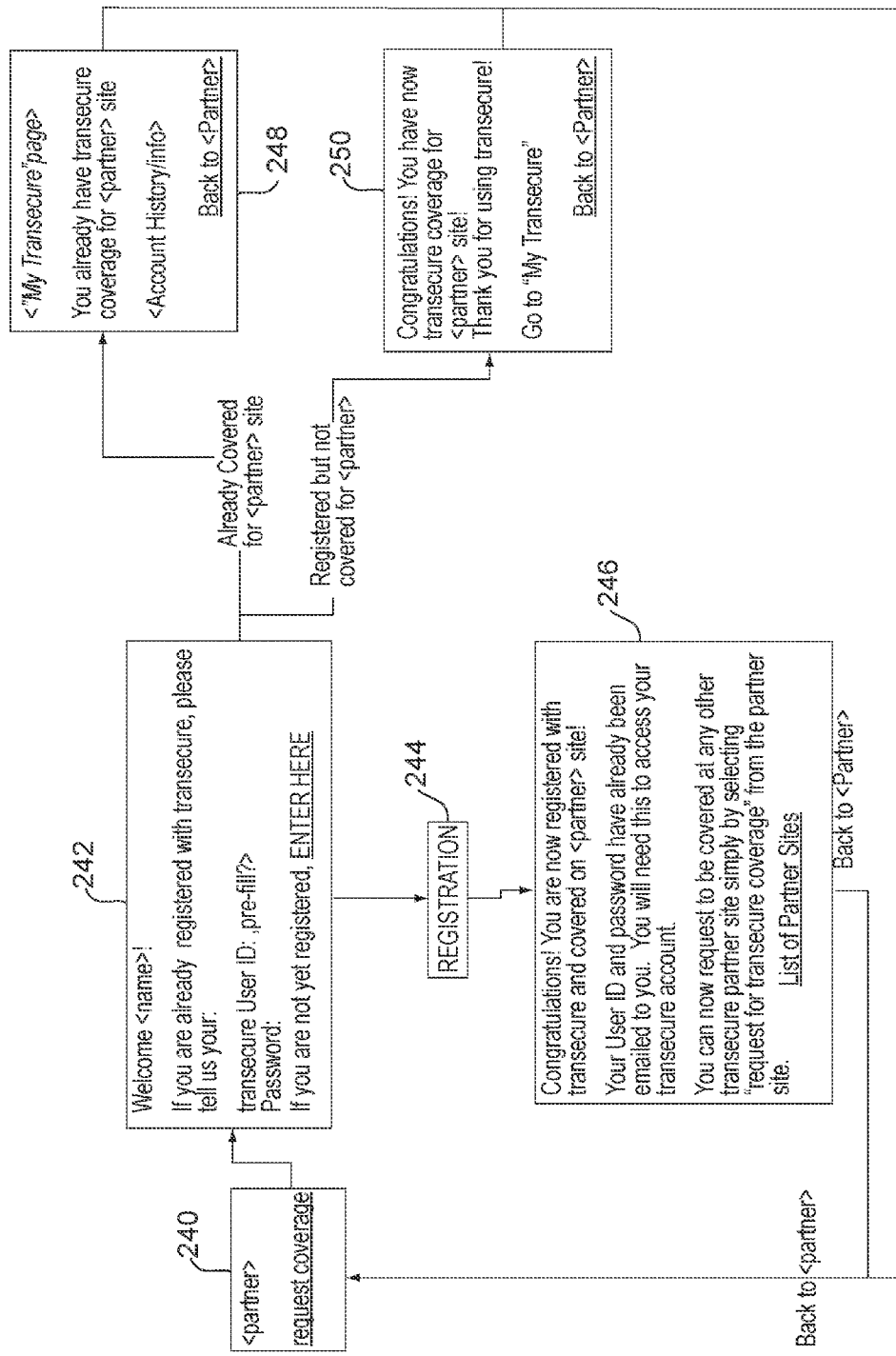
FIG. 4 is a diagram of a process to request dispute resolution coverage for a seller.

FIG. 4 is a diagram illustrating a process 240 whereby a seller can request coverage from the dispute resolution system. Upon receipt of a request to initiate coverage, the system of FIG. 1 provides the seller with a welcome page 242 where the seller can enter his or her user identification and password information. If the user is new, the seller can enter a registration page 244 by clicking on a registration hotlink. Upon completing the registration process, the process of FIG. 4 notifies the seller of a successful registration and displays other relevant information in page 246 before looping back to the start of the process 240.

From the welcome page 242, if the seller enters its identification and password information, the process of FIG. 4 checks if the seller is already covered against a particular partner, the process of FIG. 4 notifies the seller with a page 248 that coverage has already been secured for the desired partner. The page 248 also allows the user to retrieve the account history information or to jump to the beginning of the process 240.

From the welcome page 242, if the seller enters its identification and password information, and if the seller is registered with the system of FIG. 1 but is not covered for transactions with the desired partner, the process of FIG. 4 secures coverage and displays a page 250 to notify the seller that transactions with the desired partner are now covered by the dispute resolution system. The page 250 also allows the seller to jump to a personalized page in the dispute resolution system, or alternatively to jump back to the beginning of the process of FIG. 4 to continue accepting requests for coverage.

In all the above cases, if the seller's coverage is successful, the process updates a membership profile database, notifies the applicant of acceptance, and sends indicia such as a medallion to be displayed on the seller's point of sale.

Figure 5:
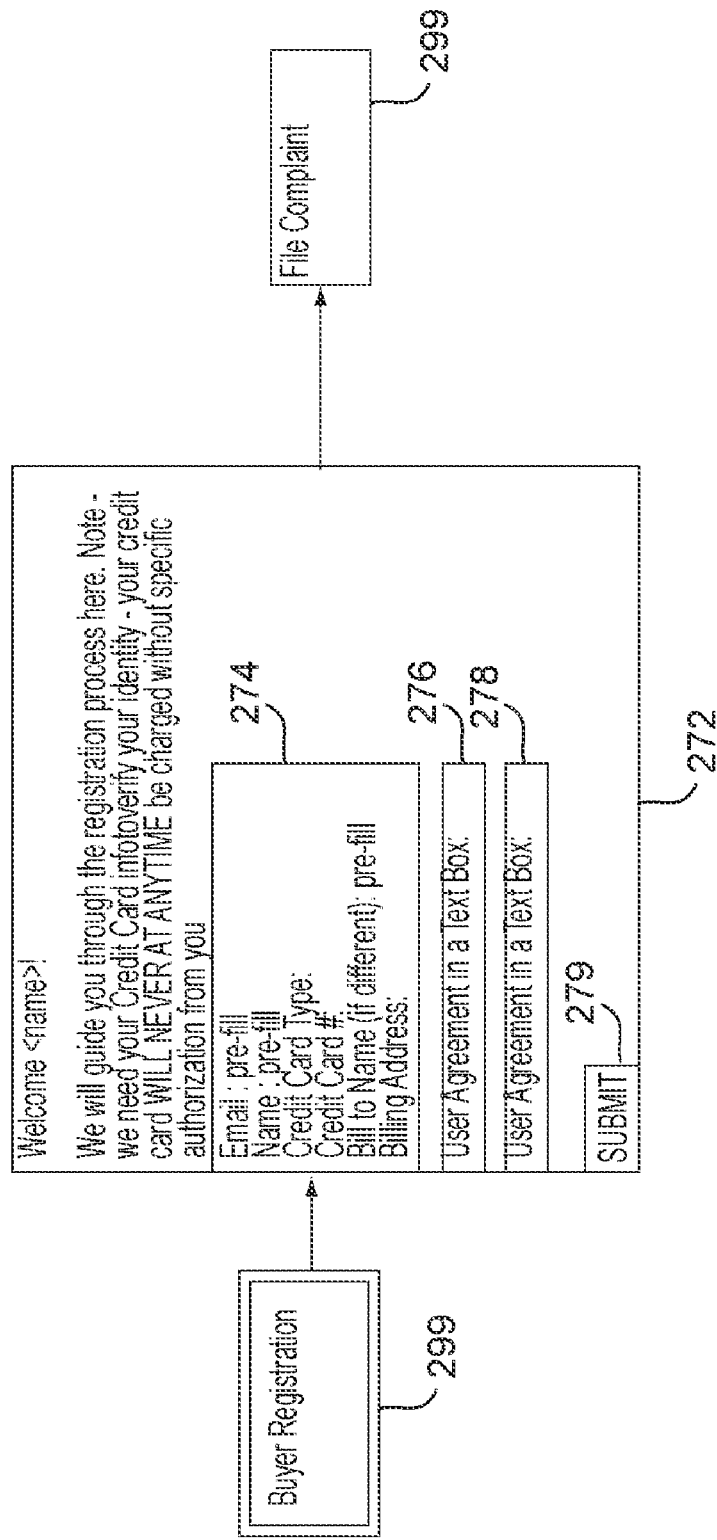
FIG. 5 is a diagram of a process for enrolling a buyer in the dispute resolution system.

FIG. 5 shows a buyer registration process 270 for enrolling a buyer with the dispute resolution system of FIG. 1. First, the system provides a registration page 272 that guides the buyer through a registration process. The page 272 requests the user to enter information in an input box 274. The information required includes certain unique user identification information such as his or her electronic mail address, name, credit card type and number, and billing address. Once the dispute being filed passes the pre-screen, the buyer is charged with a filing fee. Additionally, a user agreement is displayed in a scrolling text box 276. The agreement binds the applicant to the online dispute resolution process. The buyer can view this agreement and, if acceptable, click on an acceptance button 278. After the user has filled out all items in the screen 272, the user can then click on a submit button 279 to enroll in the system.

When the submit button 279 is selected, the process then checks whether the buyer is authorized under his or her credit arrangement. If not, the process requests the user to reenter his or her identification information. Alternatively, if the user is authorized, the process updates a membership profile database, notifies the applicant of acceptance, and buyer can proceed to file the dispute. During normal transactions, the buyer can check whether a dispute resolution system logo is shown on the seller's site. If not, the buyer can request the seller to be a member of the dispute resolution system. If the seller agrees to join the dispute resolution system, a registration process is performed. Alternatively, if the seller does not agree to the terms of the dispute resolution system, the buyer makes a decision as to whether he or she is willing to commit to purchasing without the appropriate dispute resolution assurance and either proceeds with the transaction or cancels the transaction.

Figure 6:
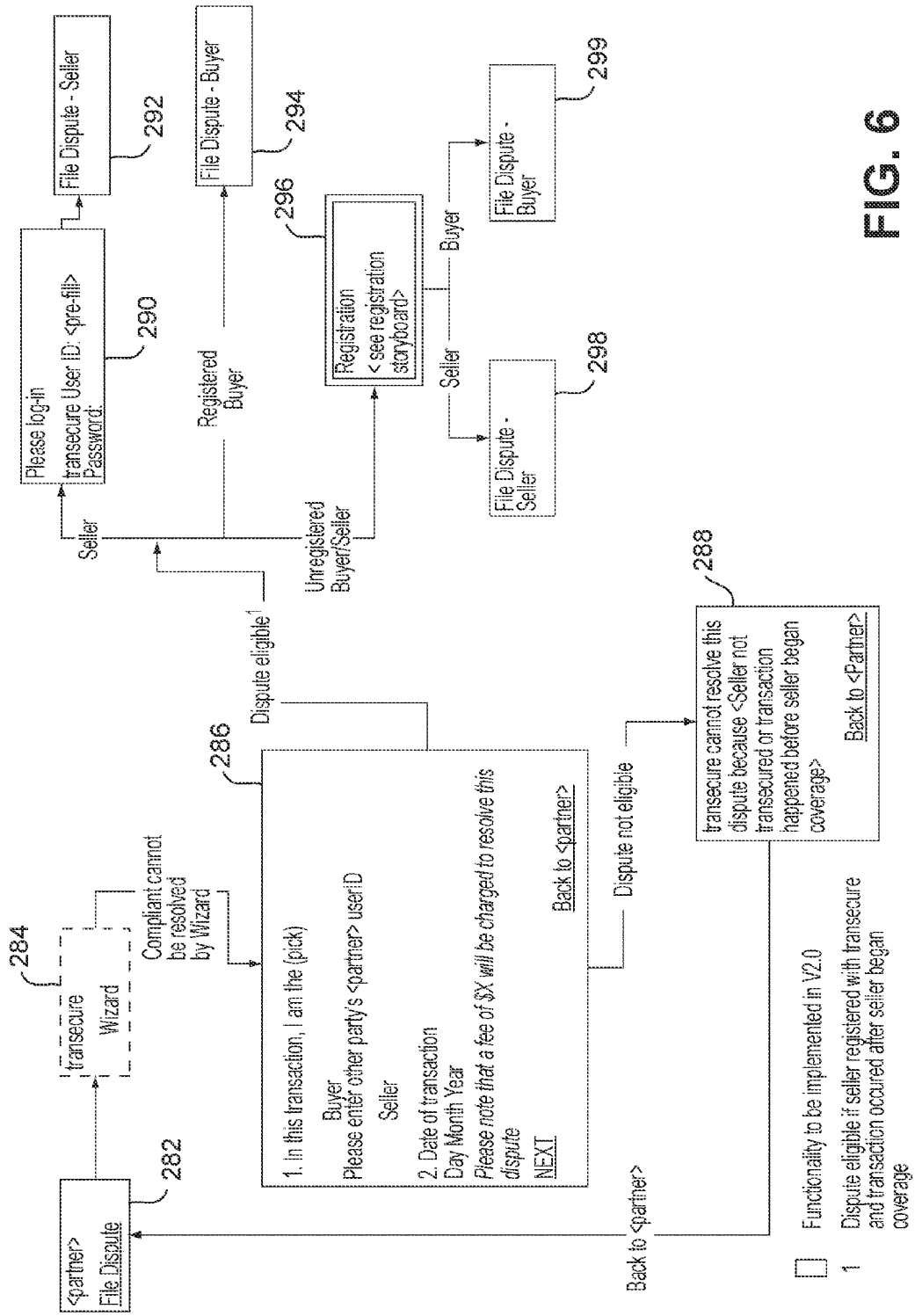
FIG. 6 is a diagram of a complaint filing pre-screen process.

After purchase, if the buyer is dissatisfied with the online transaction previously entered into, the buyer can file a complaint if he or she desires. FIG. 6 illustrates a complaint prefiling process. First, a seller or buyer initiates a dispute (step 282). The initiation of the dispute may be accomplished by answering the series of questions posed by the complaint wizard (step 284). The person filing out the form is called a complainant. The complaint wizard 284 tries to determine the nature of the dispute and if it is simple in nature, will offer suggestions for resolving the dispute without involving the dispute resolution system. If the dispute is not so simple in nature or if the complainant decides they want the dispute resolution system to resolve their dispute, the complaint wizard asks a further set of questions to determine the eligibility of the dispute (step 286). In this process, before the system accepts a complaint, two eligibility criteria have to be met: (1) the seller is covered or enrolled in the system; and, (2) the transaction occurred after coverage began. The complaint wizard then guides the complainant by selecting whether the complainant is a buyer or the seller. The complaint wizard 284 also prompts the complainant to enter the other party's user identification number and the date of the transaction, and notifies the user that a particular fee will be charged to resolve the dispute. If the complaint wizard 284 determines that the dispute is not eligible, the complaint wizard 284 displays a message that the system cannot resolve the dispute because the seller is not enrolled in the system or that the transaction occurred before coverage was available (step 288). The wizard 284 then loops back to receive additional disputes from other complainants (step 282).

From step 286, if the complaint wizard determines that the transaction is covered by the system, the complaint wizard 284 determines whether the complainant is a seller or a buyer. If the complainant is a seller, the complaint wizard 284 indicates that a fee to file a dispute will be billed to the previously entered credit card account (step 288). Next, the wizard 284 guides the user through the filling out of a complaint form (step 290). If the user does not wish to initiate the complaint, the system of FIG. 6 loops back to step 282 to handle the next dispute.

From step 286, if the transaction is covered by the system (i.e., the seller is a registered user and covered for that marketplace and the transaction occurred after the coverage began), the complaint wizard 284 indicates to the user that there is a fee to file the dispute that will be charged to the credit card as previously entered. The complaint wizard also prompts the user to enter credit card information and submits the information to a credit card provider to get approval. From step 292, if the credit card information is incorrect, the complaint wizard 284 indicates that the credit card was not approved and requests the user to either re-enter the information, in which case the process loops back to step 292 or alternatively, if the user wishes to cancel the transaction, the process loops back to step 282 to continue handling additional disputes. From step 286, if the buyer is an unregistered buyer, the system proceeds to step 270 to perform buyer registration.

The dispute resolution process is conclusive, i.e., it always results in a definitive resolution. There are four methods by which the system yields a definitive resolution. They are as follows:

Quick Resolution. The desired settlement entered by each party is compared and if there is a 100% match on selected items, e.g., monetary settlement, the dispute automatically settles and the parties are informed via email. The desired settlement items that are required to match is likely to evolve over time to more be more complex than a simple comparison—but the concept of Quick Resolution will remain unchanged Independent Resolution. After viewing the facts of the complaint filed, the respondent is given the option to directly resolve the case with the complainant. If the respondent chooses to do so, the complainant is notified and the parties are given 3 weeks to resolve the case directly. Either party may re-activate the case with the system and ask for a dispute resolution specialist to be assigned to the case at any point within the 3 weeks or for 30 days after that. The respondent may also be shown sample resolutions from the system's case-history database to help him/her directly resolve the case Conciliation. If both the above options do not work or are not applicable, the system assigns a dispute resolution specialist to the case. The dispute resolution specialist first tries to "mediate" a settlement between the parties, i.e., tries to get the parties to agree to a mutually agreeable settlement. This is carried out via email exchange between the dispute resolution specialist and the parties. Exchanges between the parties occurs via the system's website. One party does not see the other party's responses.

Resolution. Where conciliation is not possible, the dispute resolution specialist passes a resolution based on the facts of the case presented. The dispute resolution specialist does this by collecting the necessary information and evidence from the parties. The parties can see the information/evidence submitted by the other party. The parties are also given the opportunity to respond to the other party's submissions.

Figure 7:
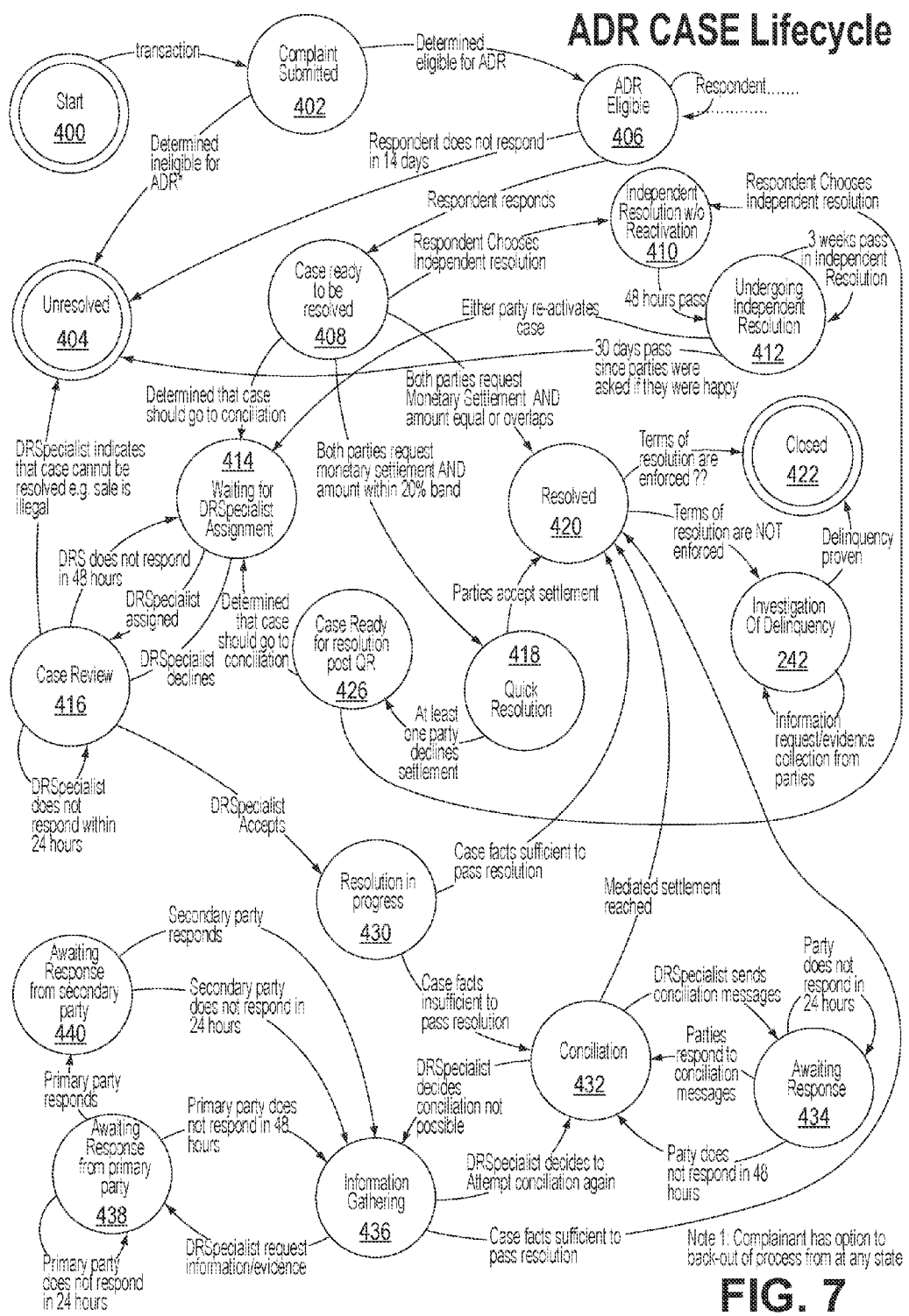
FIG. 7 is a state diagram illustrating a dispute resolution case lifecycle.

Referring now to FIG. 7, an alternative dispute resolution (ADR) case life cycle diagram is shown. The case life cycle of FIG. 7 has a plurality of states 400-440. First, from a start state 400, if a party is dissatisfied with an online transaction, the party (complainant) fills out an online form to initiate the ADR cycle. The complaint is submitted in state 402. From state 402, if the complainant is ineligible for ADR, the case proceeds to an unresolved state 404. The complainant can be "ineligible" if he or she is not enrolled in the ADR system, for example.

From state 402, if the complainant is eligible for ADR, the case proceeds to an ADR-eligible state 406. From the ADR-eligible state 406, if the respondent does not respond within a predetermined period such as fourteen days, the case proceeds to the unresolved state 404. Alternatively, if the respondent responds from state 406, the case proceeds to a resolution state 408.

From state 406, if the respondent does not respond within a predetermined period such as two or seven days, a reminder is set to the respondent and the complainant is notified of the delay in state 406.

From state 408, if the respondent chooses an independent resolution method, the case proceeds to an independent-resolution-without-reactivation state 410. From state 410, if the party does not change his or her mind within a predetermined period such as 48 hours, the case proceeds from state 410 to a state 412 which indicates that the case is undergoing independent resolution. The case remains in state 412 if the parties are satisfied. From state 412, if a predetermined period such as 30 days have passed since the party was asked if they were satisfied, then the case is considered closed and the case proceeds from state 412 to 404.

From state 408, if the case needs to go to conciliation, the case proceeds to state 414 that waits for a dispute resolution specialist assignment. State 414 can also be reached from state 412 if either party reactivates the case. From state 414, if a dispute resolution specialist is available, the case proceeds to state 416 where it is reviewed by the dispute resolution specialist. If the dispute resolution specialist does not respond within 48 hours, the dispute resolution specialist is sent a reminder.

From state 416, if the dispute resolution specialist indicates that the case cannot be resolved, the case proceeds from state 416 to the unresolved state 404. Also, while in state 416, if the dispute resolution specialist does not respond within 48 hours, the case proceeds back to state 414 to accept a new dispute resolution specialist assignment. This process is also performed if the dispute resolution specialist declines the case.

From the case-ready-to-be-solved state 408, if both parties request monetary settlement and the requested amounts are close or overlap each other slightly, the system automatically settles at the amount requested by the complainant and the parties are informed. Alternatively, if the amount is within 20% of each other, the parties are asked if they will settle at the midpoint of their offers. If the parties agree, then the case proceeds from state 408 to a quick-resolution state 418. From the quick-resolution state 418, if both parties accept the settlement, the case proceeds to a resolved state 420. Alternatively, if at least one party declines the settlement, the case proceeds from state 418 to a case-ready-for-resolution-post-quick-resolution state 426.

From state 426, if it is determined that the case should go to conciliation, the transition from state 426 to state 414. From the case-review state 416, if a dispute resolution specialist accepts, the case transitions to a resolution-in-progress state 430. If sufficient facts exist to pass resolution of the case, the case proceeds from state 430 back to state 420 where it is resolved. Alternatively, if insufficient facts exist to pass resolution, the case proceeds from state 430 to a conciliation state 432.

While in conciliation state 432, the specialist exchanges messages with the two parties to try and reach a mediated settlement. While in the conciliation state 432, if the dispute resolution specialist sends conciliation messages, the case transition to state 434 where it awaits a response. If the parties respond, then the case transitions from state 434 back to state 432. Alternatively, if the parties do not respond within a predetermined period such as 48 hours, the system transitions from state 434 back to state 432.

If a mediated settlement is reached, the case transitions from the conciliation state 432 to the resolved state 420. Alternatively, while in the conciliation state 432, if the dispute resolution specialist sends conciliation messages, the system transition to state 434 where it awaits a response. If the parties respond, then the system transitions from state 434 back to state 432. Alternatively, if the parties do not respond in 48 hours, the system also transitions from state 434 back to state 432.

From state 432, once the dispute resolution specialist decides that conciliation is not possible, the case transitions from the conciliation state 432 to an information-gathering state 436. In state 436, if the specialist decides not to attempt conciliation again, then the case transitions from state 436 back to state 432. Alternatively, if sufficient facts exist to pass resolution, the case proceeds from state 436 back to the resolved state 420. Further, while in the information gathering state 436, if the dispute resolution specialist requests information or evidence, the case transitions from state 436 to state 438 where the system waits for a response from one of the parties. If the primary party does not respond within 48 hours, the case transitions from state 438 back to state 436. Alternatively, if the primary party responds, the case transitions from state 438 to state 440 where it awaits a response from a secondary party.

From state 440, if the secondary party responds, the case transitions from state 440 to state 436. Alternatively, if the secondary party does not respond, the case also moves back to state 436 to continue the information gathering process.

The evidence collection process discussed above enables the parties to electronically submit photographs (JPEG, GIF file attachments) as well as expert testimonials (scanned and submitted electronically). The system can resolve disputes among multiple parties and allow the additional parties, the complainant, respondent and specialist (e.g. appraiser) to participate in the discovery and evidence submission process.

Using the above life cycle diagram, an exemplary process for initiating a complaint is discussed next. First, a complainant submits a complaint. Upon receipt of a complaint, the system sends an acknowledgment message to the complainant. The acknowledgment can be sent using regular mail, electronic mail, or any other suitable medium. Next, the system sends a notification message to a respondent. The notification can be sent using electronic mail, for example. Next, the system determines whether the respondent has responded within a first predetermined time limit. If the respondent fails to respond within the first predetermined time period, the system sends a reminder message to the respondent and notifies the complainant that a delay has occurred.

The system then waits for a second predetermined delay and checks whether the respondent has responded after the second predetermined period. If the respondent fails to respond during the second time period, the system sends an urgent reminder or message to the respondent about a possible default action against the respondent. Then, the system waits for a third predetermined period. Next, the system checks whether the respondent has responded to the urgent message. If the respondent fails to respond after the expiration of the third time period, the system notifies the respondent of an adverse (default) decision; notifies the complainant of a default victory; and closes the case.

If the respondent acknowledges receipt of his or her notification and responds to the dispute resolution system, the system requests information and/or evidence from both parties. Next, the system requests settlement offers from both parties and determines whether the responses are timely. If not, the system applies a set of default values as settlement offers. The system then determines whether the parties offers are within a predetermined range. If so, the system takes the offer and informs both parties. Alternatively, if the parties are far apart in their settlement offers, the system identifies and checks whether a dispute resolution system specialist can handle the dispute.

Once a specialist accepts, the system retrieves necessary information and sends the information to the specialist. The specialist first tries conciliation, i.e., tries to mediate a settlement between the parties. Failing that, the specialist requests information or evidence necessary to pass a resolution. Hence, by the end of the process, the specialist can make a final decision, upon which the case is closed.

The process communicates with the disputing parties as frequently as necessary to ensure full involvement. All parties are informed of every action that takes place during the process. All parties are also informed of what the next steps will be and are alerted to what they should expect in the near future. In one embodiment, steps associated with resolving a particular complaint once a complainant files a complaint are as follows:

Resolutions
Acknowledgement email to complainant.
Notification email to respondent.
If respondent does not respond to filed complaint after 48 hours:
  Email sent reminding party to urgently respond within the next 24 hours;
  Complainant notified of delay.
If respondent still does not respond after 7 days:
  Urgent reminder sent to respondent notifying them that if they fail to respond within the next 7 days, the case will be closed and necessary disciplinary action will be taken;
  Complainant notified of delay.
If respondent does not respond after 14 days:
  Final notice sent to respondent notifying them that the case is closed and that necessary disciplinary action will be taken against them;
  Complainant notified.
Once dispute resolution specialist is assigned:
  Notification email to complainant, respondent, and dispute resolution specialist.
If dispute resolution specialist does not respond within 24 hours, reminder sent and response urgently requested in the following 24 hours.
If dispute resolution specialist still does not respond:
  Case re-assigned to new dispute resolution specialist;
  Complainant and respondent notified;
  Delinquent dispute resolution specialist contacted by telephone (by dispute resolution specialist manager) to investigate problem.
Conciliation
Notification of request for conciliation information sent by dispute resolution specialist to chosen party
Above step is repeated as many times as dispute resolution specialist deems necessary.
If successful, the dispute resolution specialist passes a conciliated settlement and the parties are informed.
If either party does not respond to conciliation request within 24 hours:
  email reminder is sent requesting response within the next 24 hours;
  other party notified of delay.
If the party does not respond within the next 24 hours, dispute resolution specialist passes resolution based on information already received
Information Gathering
Notification of request for information/evidence sent by dispute resolution specialist to chosen party.
Above step is repeated as many times as dispute resolution specialist deems necessary.
At the end of this process, dispute resolution specialist passes a resolution and the parties are informed.
If either party does not respond to request within 24 hours:
  email reminder is sent requesting response within the next 24 hours;
  other party notified of delay.
If the party does not respond within the next 24 hours, dispute resolution specialist passes resolution based on information already received.
Judgment
Both parties are informed once resolution is passed.

Figure 8:
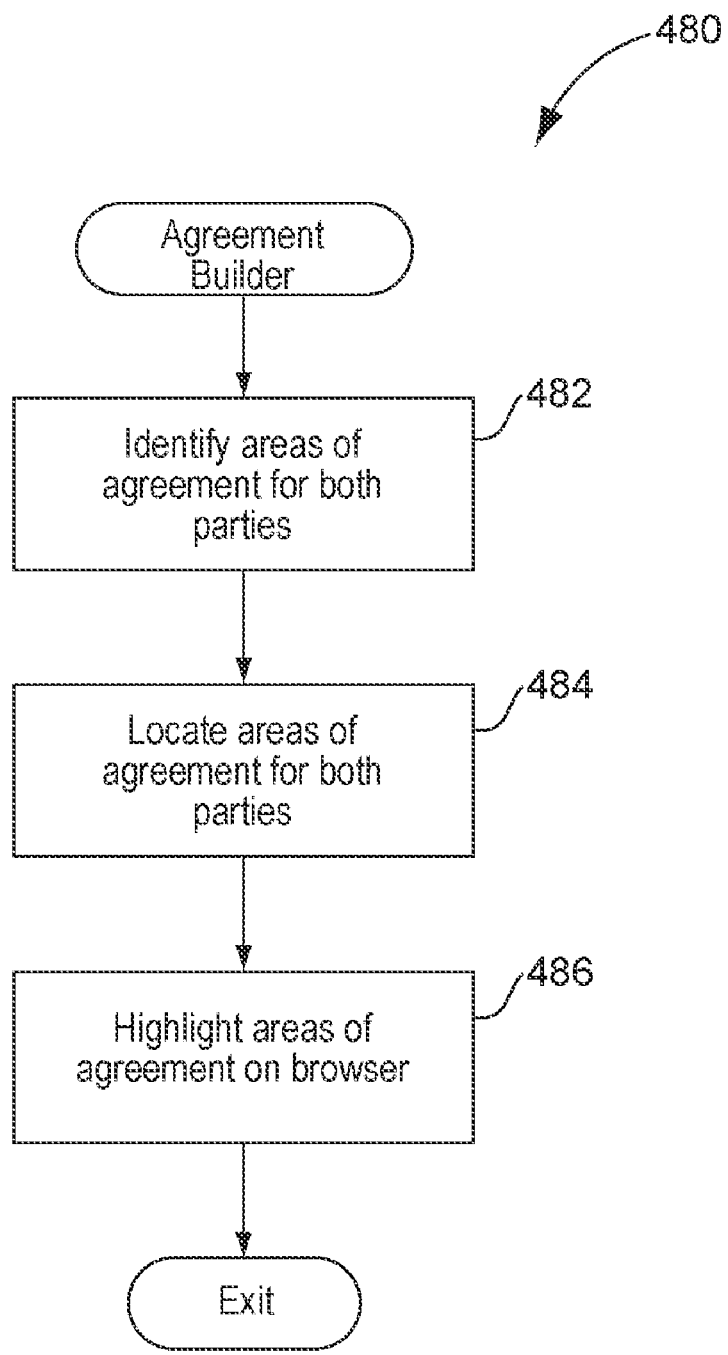
FIG. 8 is a flow chart illustrating a process to highlight areas of agreement.

Referring now to FIG. 8, a process 480 identifying and emphasizing areas of agreement between the parties is shown. First, the process 480 identifies areas of agreement for both parties (step 482). The areas of agreement could vary within a small predetermined range and still be considered "agreement." Next, the process 280 locates areas of agreement for both parties on their respective pages (step 484). These areas are highlighted so that the parties can view them on the browser (step 486). Finally, the process 480 exits.

Figure 9:
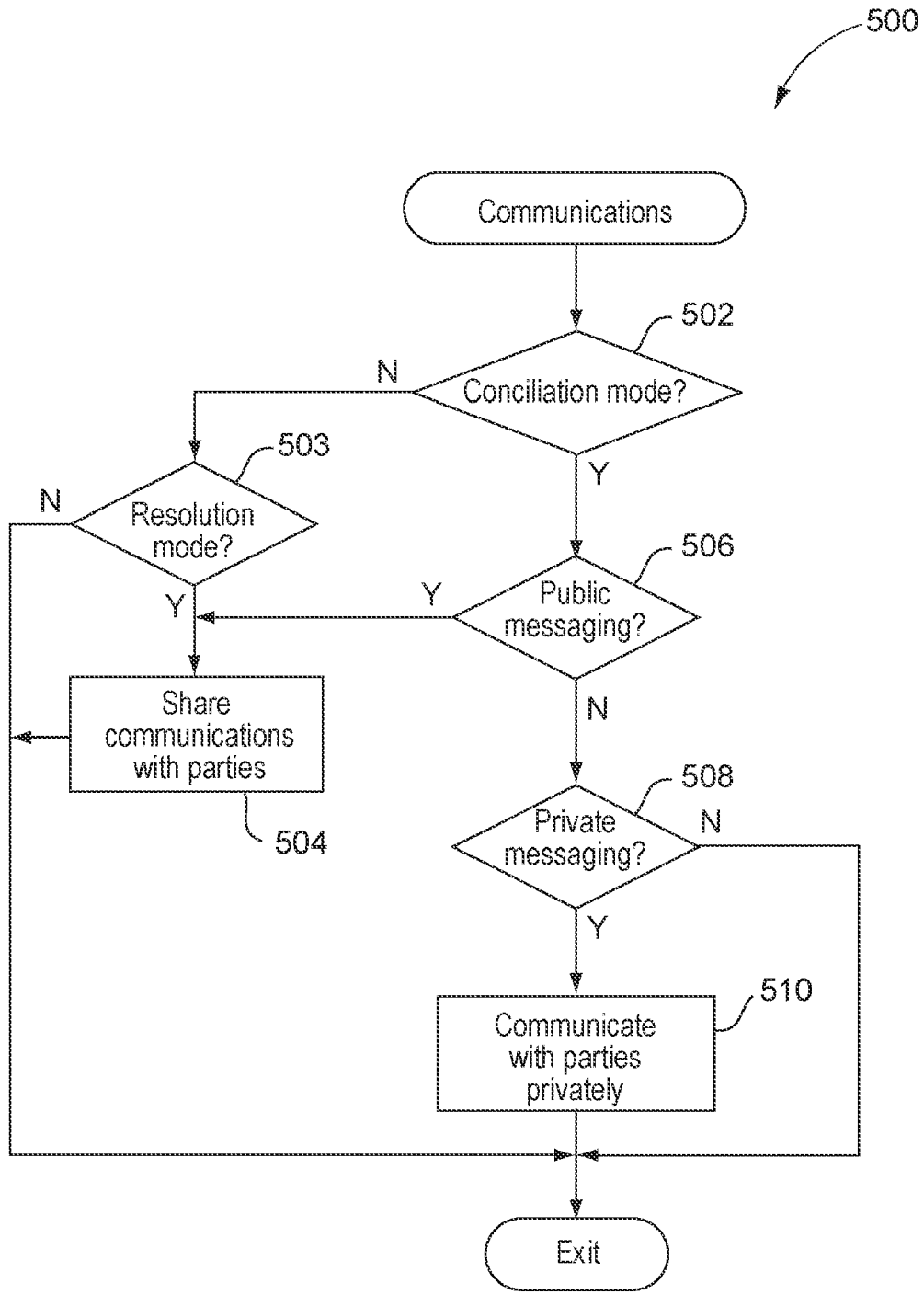
FIG. 9 is a flow chart illustrating a process to communicate with the parties based on a mode of dispute resolution.

Referring now to FIG. 9, a process 500 for supporting two modes of communication between the parties and the dispute resolution system is shown. First, the process 500 checks whether the parties are in a conciliation mode (step 502). If not, the process 500 checks whether the parties are in a dispute resolution mode (step 503). If not, the process 500 exits. Alternatively, if the parties are in the resolution mode, the process shares communications with both parties (step 504).

From step 502, if the process 500 is in a conciliation mode, the process 500 checks whether the parties should be in a public messaging mode (step 506). If so, the process 500 jumps to step 504. Alternatively, the process 500 checks whether the parties should be in a private messaging mode (step 508). If so, the process 500 handles communications between parties in a private manner (step 510). From steps 503, 508 and 510, the process 500 exits.

Figure 10:
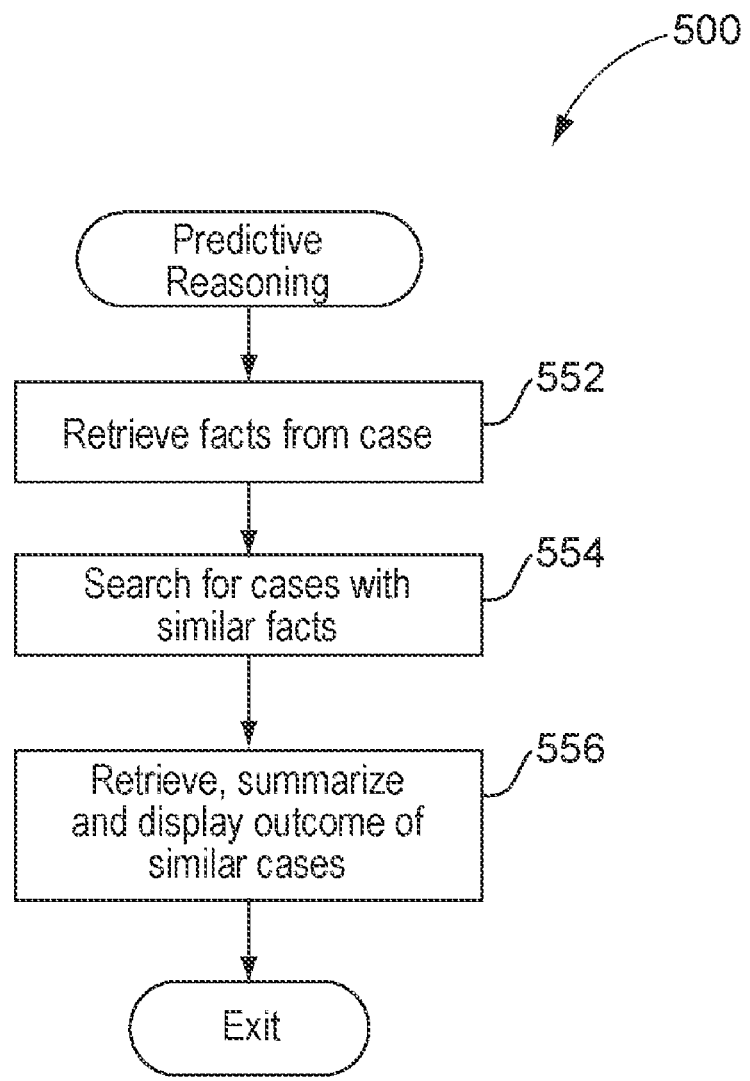
FIG. 10 is a flow chart illustrating a process to predict the outcome of a case based on similar cases that have been resolved by the dispute resolution system.

Referring now to FIG. 10, a predictive reasoning process 500 is shown. This process assists the dispute resolution specialists as well as the parties themselves in deciding a fair resolution of the dispute. First, the process 500 retrieves facts associated from the current case (step 552). Next, the process 500 searches for cases with similar facts in this database (step 554). Finally, the process 500 retrieves and summarizes and displays the outcomes of the similar cases for all parties and the dispute resolution specialist to see. Finally, the process then exits.

The search of cases with similar facts can be done using a conventional database search, or can be done using a number of machine learning systems, including case-based reasoning, neural networks, fuzzy networks, genetic algorithms (including genetic programming and classifier systems), Evolutionary Strategies, Evolutionary Programming, ADATE program induction, cellular automata, Box Jenkins optimization, ARMA optimization and many others. Rather than applying a direct computational approach, these systems create one or more proposed solutions in the form of data and computer program entities, and iteratively alter the data and/or entities for finding known solutions to the dispute at hand.

Figure 11:
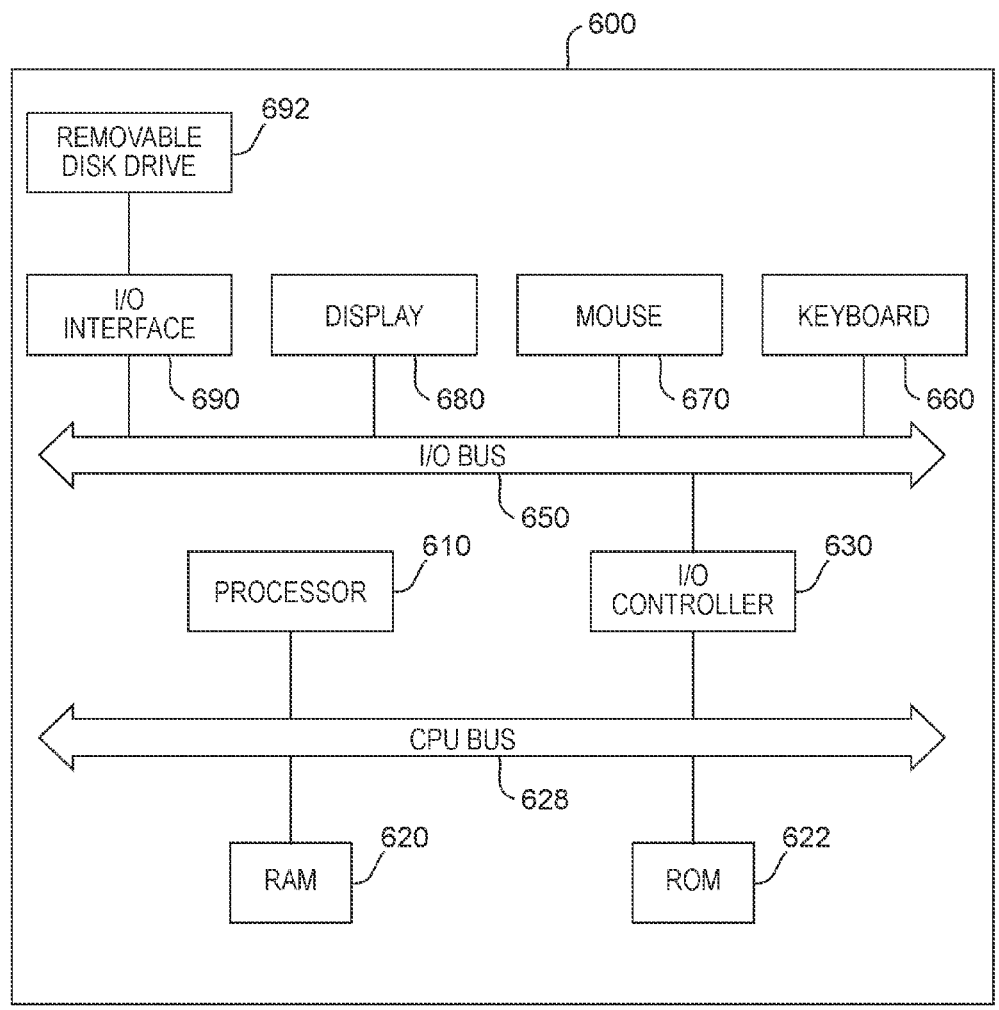
FIG. 11 is a diagram of a client computer capable of supporting electronic dispute resolution.

As discussed above, the system enhances consumer's comfort and security of conducting online transactions using a combination of technology and human infrastructure that allows an objective third party to resolve disputes arising from online transactions. Disputes are resolved in as fair a manner as possible, and the dispute resolution process is conclusive, i.e., it always results in a definitive resolution. The dispute resolution process turnaround time is short. The system communicates with the disputing parties as frequently as necessary to ensure full participation and involvement. The process minimizes, where possible, lengthy or duplicative data entry by disputing parties. Further, dispute related data is treated with highest levels of security and as highly private The techniques described here may be implemented in hardware or software, or a combination of the two. In one embodiment, the invention is implemented in a computer program executing in a computer system. Such a computer system may include a processor, a data storage system, at least one input device, and an output device. FIG. 11 illustrates one such computer system 600, including a processor (CPU) 610, a RAM 620, a ROM 622 and an I/O controller 630 coupled by a CPU bus 628. The I/O controller 630 is also coupled by an I/O bus 650 to input devices such as a keyboard 660, a mouse 670, and output devices such as a monitor 680. Additionally, one or more data storage devices 692 are connected to the I/O bus using an I/O interface 690. Further, variations to the basic computer system of FIG. 11 are within the scope of the present invention. For example, instead of using a mouse as user input devices, a pressure-sensitive pen, digitizer or tablet may be used.

The above-described software can be implemented in a high level procedural or object-oriented programming language to operate on a dedicated or embedded system. Software may include microcode or conventional program implemented in a high level procedural or object-oriented programming language to communicate with a computer system. However, the programs can be implemented in assembly or machine language, if desired. In any case, the language may be a compiled or interpreted language.

Each such computer program can be stored on a storage medium or device (e.g., CD-ROM, hard disk or magnetic diskette) that is readable by a general or special purpose programmable computer for configuring and operating the computer when the storage medium or device is read by the computer to perform the procedures described. The system also may be implemented as a computer-readable storage medium, configured with a computer program, where the storage medium so configured causes a computer to operate in a specific and predefined manner.

While the invention has been shown and described with reference to one or more embodiments thereof, those skilled in the art will understand that the above and other changes in form and detail may be made without departing from the spirit and scope of the following claims.

The invention claimed is:

1. A method comprising:
providing an online dispute resolution system electronically coupled to an electronic marketplace that provides a website by which users buy and sell items, wherein the electronic marketplace includes a database that stores transaction data that describes transactions within the marketplace;
electronically receiving with the online dispute resolution system at least a portion of the transaction data from the database of the electronic marketplace in response to initiation of a dispute; and
utilizing the received portion of the transaction data in accordance with a dispute resolution process to assist the users in resolving disputes relating to the transactions within the electronic marketplace.

2. The method of claim 1, further comprising:
electronically receiving with the online dispute resolution system communications from the users of the electronic marketplace to initiate filing of disputes; and
initiating the online dispute resolution process in response to the communications.

3. The method of claim 1, further comprising:
electronically receiving with the online dispute resolution system enrollment requests from the sellers of the marketplace; and
automatically initiating enrollment of the sellers within the dispute resolution system in response to the requests.

4. A method comprising:
storing transaction data in a database of a electronic marketplace, wherein the transaction data describe transactions within the electronic marketplace;
receiving case information with an online dispute resolution system from one or more parties, wherein the case information describes a dispute related to one of the transactions of the electronic marketplace; and
executing a dispute resolution process with the online dispute resolution system that receives at least a portion of the transaction data stored from the database of the electronic marketplace without human intervention in response to initiation of the dispute and uses the received portion of the transaction data and the case information from the parties to assist the parties in resolving the dispute.

5. A system comprising:
an online dispute resolution system that executes a dispute resolution process; and
an electronic marketplace system that includes:
  (i) a web server that provides a centralized trading place for a plurality of buyers and a plurality of sellers,
  (ii) a database that stores data, and
  (iii) a software object that communicates the data from the database to the online dispute resolution system to inform the online dispute resolution system of transactions performed by the plurality of buyers and the plurality of sellers within the electronic marketplace system.

* * * * *